(12) United States Patent
Hinaga (10) Patent No.: US 7,978,849 B2
(45) Date of Patent: Jul. 12, 2011

(54) IMAGE FORMING APPARATUS, AND CONTROL METHOD THEREOF

(75) Inventor: Keiichi Hinaga, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 855 days.

(21) Appl. No.: 11/942,071

(22) Filed: Nov. 19, 2007

(65) Prior Publication Data
US 2009/0262927 A1    Oct. 22, 2009

(51) Int. Cl.
*H04L 9/00* (2006.01)
*G06F 7/04* (2006.01)

(52) U.S. Cl. .......................................... 380/45; 726/26

(58) Field of Classification Search .................... 380/45; 726/26
See application file for complete search history.

(56) References Cited

U.S. PATENT DOCUMENTS

| | | | |
|---|---|---|---|
| 4,605,820 A * | 8/1986 | Campbell, Jr. ............. | 705/71 |
| 6,742,116 B1 * | 5/2004 | Matsui et al. ................ | 713/171 |
| 6,996,583 B2 * | 2/2006 | Wilmot ........................ | 1/1 |
| 7,278,031 B1 * | 10/2007 | Best ............................ | 713/193 |
| 7,451,166 B2 * | 11/2008 | Damani et al. ............... | 1/1 |
| 7,774,602 B2 * | 8/2010 | O'Brien et al. ............. | 713/171 |
| 2002/0023219 A1 * | 2/2002 | Treffers et al. ............. | 713/176 |
| 2003/0007437 A1 * | 1/2003 | Staring ........................ | 369/53.21 |
| 2004/0160445 A1 * | 8/2004 | Whatmough .................. | 345/473 |
| 2009/0292918 A1 * | 11/2009 | Mori et al. ................... | 713/168 |

FOREIGN PATENT DOCUMENTS

| | | |
|---|---|---|
| JP | 2005-125607 | 5/2005 |
| JP | 2005-172866 | 6/2005 |
| JP | 2005-348250 | 12/2005 |

* cited by examiner

*Primary Examiner* — Techane J Gergiso
(74) *Attorney, Agent, or Firm* — Turocy & Watson, LLP (57) ABSTRACT

An image forming apparatus of the invention includes a key generating unit to change an encryption key and to generate an encryption key different from the previous encryption key at each time of change, an encryption unit to encrypt image data using the encryption key generated by the key generating unit, a first storage unit to store the encrypted image data, a second storage unit to store the encryption key and a table to correlate the image data encrypted by the encryption key with the encryption key, and a decryption unit to decrypt the data stored in the first storage unit by using the encryption key correlated in the table. According to the image forming apparatus of the invention, the read data can be stored with high security into a storage apparatus such as an HDD, while an operation burden is not imposed on a user.

20 Claims, 5 Drawing Sheets

IMAGE FORMING APPARATUS, AND CONTROL METHOD THEREOF

BACKGROUND OF THE INVENTION

1. Field of the Invention

The present invention relates to an image forming apparatus and a control method thereof, and particularly to an image forming apparatus having a file storage function and a control method thereof.

2. Description of the Related Art

Recently, an image forming apparatus such as a digital compound machine (Multi-Function Peripheral) or an image reading apparatus such as a scanner apparatus is often constructed such that a large capacity storage apparatus such as, for example, an HDD (Hard Disk Drive) is incorporated and an image file of a read original document can be stored in this storage apparatus.

The image file stored in the HDD or the like can be read from the HDD or the like and can be printed as required, or can be captured in an information processing apparatus such as a personal computer (PC).

On the other hand, documents to be read by the image forming apparatus or the like include a highly confidential document. In order to prevent illegal access to the highly confidential document or falsification thereof, it is necessary to take security measures at the time of storage into the HDD or the like.

As the security measures taken in the related art, there is an encryption method using an encryption key (common key). This method is such that a highly confidential document is encrypted using the encryption key previously provided to the apparatus, and then is stored in the HDD or the like, and data read from the HDD or the like is also decrypted using this common key.

However, in the related art image forming apparatus, the same encryption key is generally continuously used. Thus, it is impossible to completely preclude the possibility that the encryption key is estimated by analyzing the encrypted document stored for a long period of time. In case the encryption key is estimated, there is a possibility that the confidential document stored in the HDD or the like is decoded or falsified, and the damage at that time is enormous.

In order to improve the security at the time of storage into the HDD of the image forming apparatus or the like, for example, JP-A 2005-34825 discloses a technique in which both a common key and a public key are used. The data encrypted by the common key is stored in the HDD, the common key is encrypted by the public key, and the encrypted common key is also stored in the same HDD. When the data read from the HDD is decrypted, an IC card in which a secret key paired with the public key is stored is inserted in the image forming apparatus, the common key is first decrypted by the secret key, and the data is decrypted by the decrypted common key. According to the technique disclosed in JP-A 2005-34825, although it is certain that the decoding itself of the data becomes difficult, the IC card must be carried at each time of reading from the HDD, which is troublesome in operation, and there occurs a new security problem, such as safekeeping and management of the IC card.

SUMMARY OF THE INVENTION

The present invention has been made in view of the above circumstances, and has an object to provide an image forming apparatus and a control method thereof, in which read data can be stored with high security into a storage apparatus such as an HDD, while an operation burden is not imposed on a user.

In order to achieve the above object, according to an aspect of the invention, an image forming apparatus includes a key generating unit configured to change an encryption key and to generate the encryption key different from the previous encryption key at each time of change, an encryption unit configured to encrypt image data using the encryption key generated by the key generating unit, a first storage unit configured to store the encrypted image data, a second storage unit configured to store the encryption key and a table to correlate the image data encrypted by the encryption key with the encryption key, and a decryption unit configured to decrypt the data stored in the first storage unit by using the encryption key correlated in the table.

Besides, in order to achieve the above object, according to another aspect of the invention, an image forming apparatus includes means for changing an encryption key, means for generating the encryption key different from the previous encryption key at each time of change, means for encrypting image data using the generated encryption key, first means for storing the encrypted image data, second means for storing the encryption key and a table to correlate the image data encrypted by the encryption key with the encryption key, and means for decrypting the stored image data by using the encryption key correlated in the table.

Besides, in order to achieve the above object, according to another aspect of the invention, a control method of an image forming apparatus includes the steps of generating an encryption key, generating the encryption key different from the previous encryption key at each time of change, encrypting image data using the encryption key generated by the key generating unit, storing the encrypted image data into a first storage unit, storing the encryption key and a table to correlate the image data encrypted by the encryption key with the encryption key into a second storage unit, and decrypting the data stored in the first storage unit by using the encryption key correlated in the table.

DETAILED DESCRIPTION OF THE PREFERRED EMBODIMENTS

Embodiments of an image forming apparatus of the invention and a control method thereof will be described with reference to the accompanying drawings.

(1) Structure of Image Forming Apparatus

Figure 1:
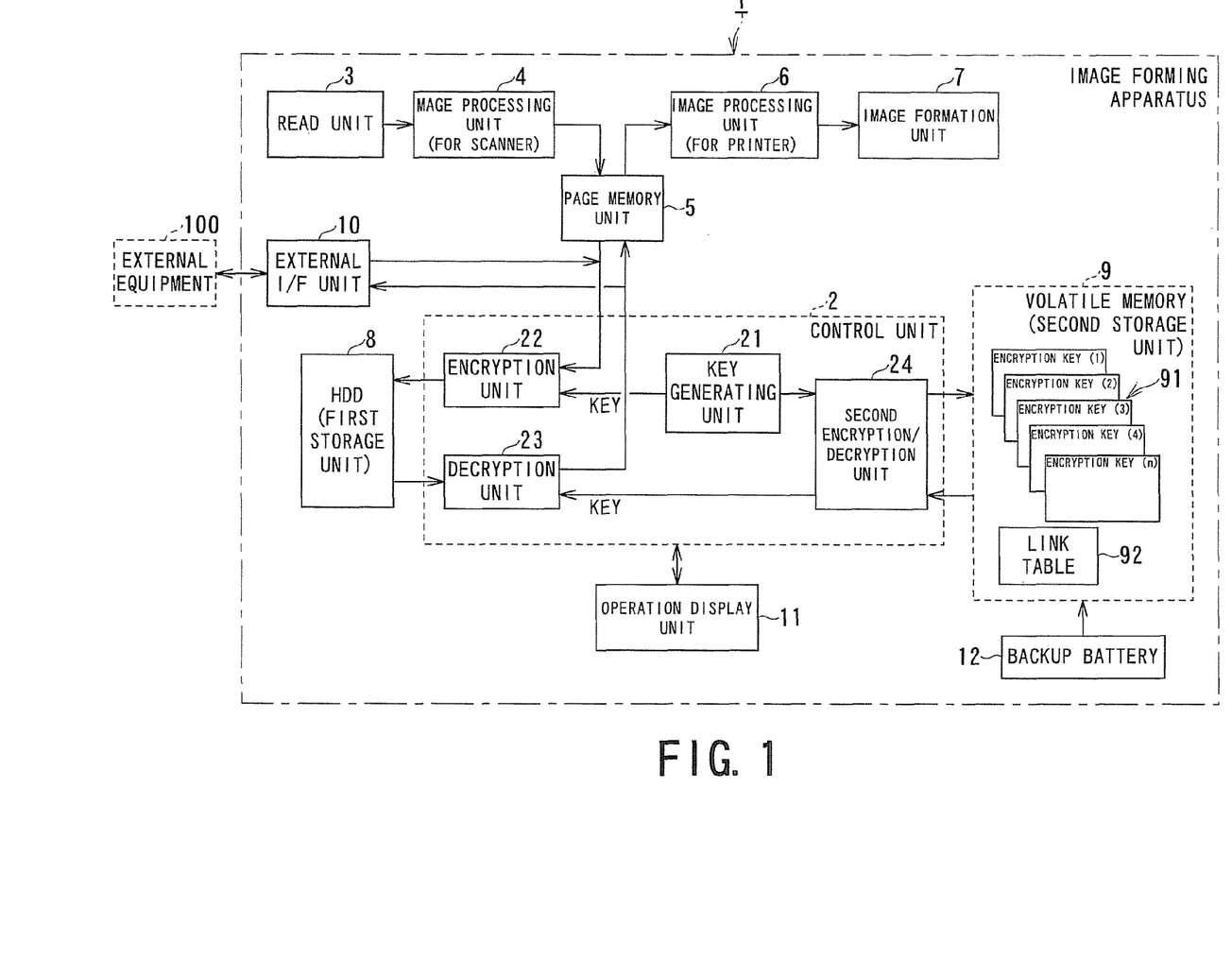
FIG. 1 is a view showing an example of the whole structure of an image forming apparatus according to an embodiment of the invention.

FIG. 1 is a view showing an example of a system structure of an image forming apparatus 1 according to an embodiment.

The image forming apparatus 1 is, for example, an apparatus called a digital MFP (Multi-Function Peripheral) having plural functions such as a copy function, a printer function, a scanner function, and a fax function.

The image forming apparatus 1 includes a control unit 2, a read unit 3, an image processing unit (for scanner) 4, a page memory unit 5, an image processing unit (for printer) 6, an image formation unit 7, an HDD (first storage unit) 8, a volatile memory (second storage unit) 9, an external I/F unit 10, an operation display unit 11, a backup battery 12 and the like.

The control unit 2 includes a processor and the like, and controls the whole image forming apparatus 1, and further performs the encryption and decryption of image data to be stored in the HDD 8, and control relating to the encryption and decryption.

As the structure relating to the encryption and decryption, the control unit 2 includes a key generating unit 21, an encryption unit 22, a decryption unit 23, and a second encryption/decryption unit 24.

The read unit 3 optically reads an original document by a CCD sensor or the like and generates image data.

The generated image data is subjected to a scanner image process, such as a shading correction to correct irregularity of a light source in a main scanning direction or irregularity of sensitivity of a CCD sensor, by the image processing unit (for scanner) 4.

In the page memory unit 5, the image data outputted from the image processing unit (for scanner) 4 is temporarily stored in page units, and then is outputted to the image processing unit (for printer) 6.

In the image processing unit (for printer) 6, various image processes for printing, such as a color conversion process and a gradation process, are performed on the image data outputted from the page memory unit 5.

The image data subjected to the image process is printed on a record sheet by using, for example, an electrophotographic system in the image formation unit 7.

The image data stored in the page memory unit 5 can be stored in a large capacity nonvolatile storage device, for example, the HDD 8 as required. Besides, the image data stored in the HDD 8 is read as required, is outputted to the image processing unit (for printer) 6 through the page memory unit 5, and can be printed on the record sheet in the image formation unit 7.

When highly confidential image data is stored in the HDD 8, encryption is performed using an encryption key. The volatile memory 9 is a memory to store encryption keys 91 and a link table 92 to correlate image data with an encryption key, and power is supplied by the backup battery 12. The operation of the control unit 2 relating to the encryption and decryption and the control of the volatile memory 9 relating to this are important points of the embodiment, and the operation will be described later in detail.

The file of the image data encrypted and stored in the HDD 8 is read as required, and after decryption, it can be outputted to an external equipment 100, for example, a personal computer through the external I/F unit 10. On the other hand, image data is inputted from the external equipment 100 through the external I/F unit 10 and can be stored in the HDD 8 after encryption.

The operation display unit 11 functions as a user interface, and includes various input keys, a display panel, a touch panel and the like.

A description will be given to the operation of the image forming apparatus 1 constructed as stated above, especially to the control operation relating to the encryption and decryption of image data to be stored in the HDD 8.

(2) Encryption and Storage Operation

Figure 2:
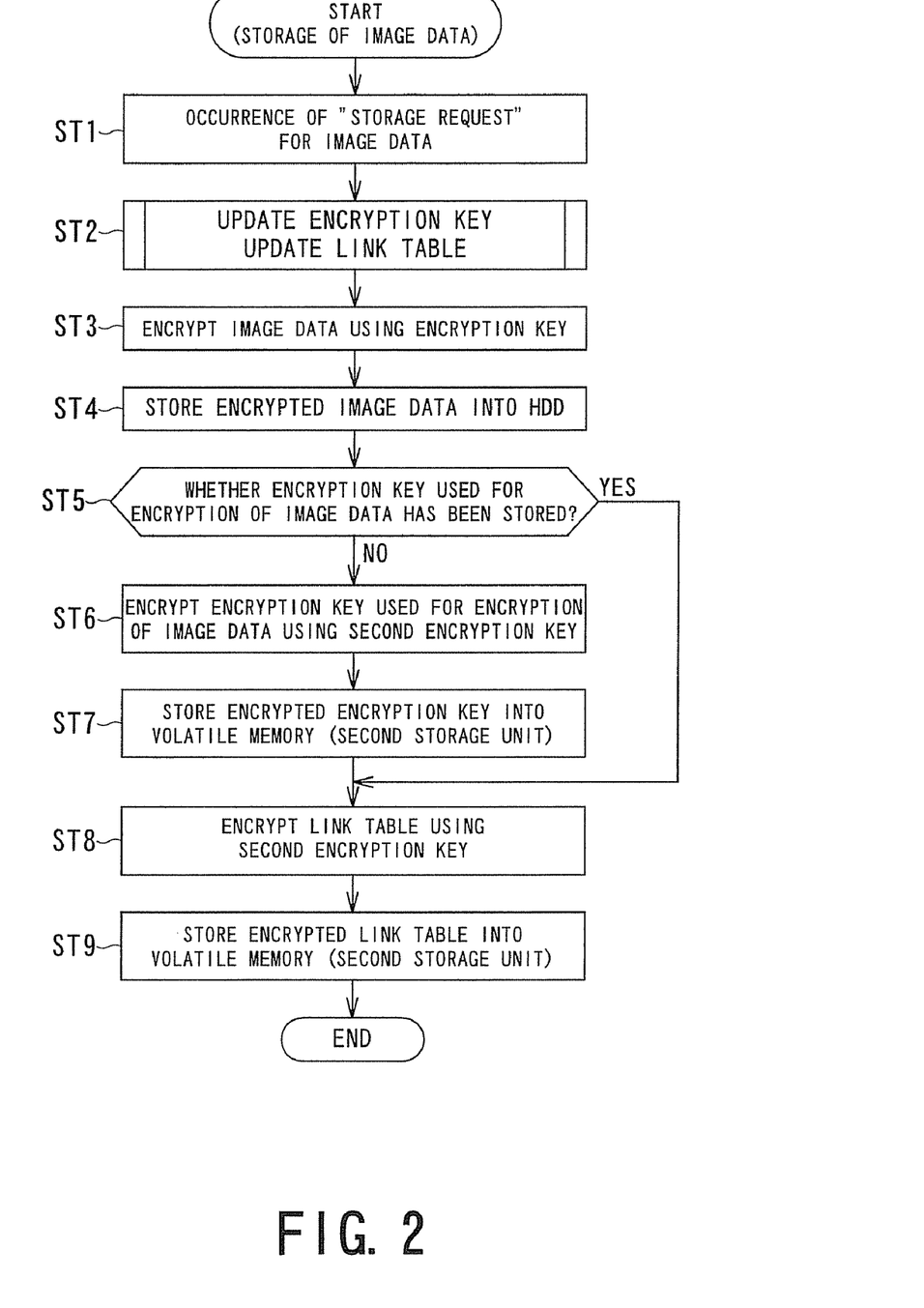
FIG. 2 is a flowchart showing an example of an encryption process and a storage process of image data.

FIG. 2 is a flowchart showing a process example in a case where image data is encrypted and is stored in the HDD 8.

An instruction to encrypt and store image data is performed by, for example, user's operation of the operation display unit 11. When the storage of the image data is instructed, in response thereto, the control unit 2 generates a storage request of the image data (step ST1).

When the storage request of the image data is generated, the key generating unit 21 of the control unit 2 performs update of the encryption key and update of the link table (step ST2).

In the related art image forming apparatus, in general, update of an encryption key is not performed, and the encryption key set at the time of shipment is continuously used. Thus, for example, in the case where the HDD 8 is illegally taken out, since a large amount of image data encrypted by the same encryption key are stored in the HDD 8, there is a possibility that the encryption key is estimated by analyzing them.

On the other hand, in this embodiment, the encryption key is successively updated. New different encryption keys are successively generated by the update, these different encryption keys are denoted as an encryption key (1) to an encryption key (n), while a general term for them is denoted as the encryption key 91 (see FIG. 1).

The image data is encrypted by using the updated encryption key 91, so that the image data encrypted by the encryption keys 91 quite different from each other for the respective image data are stored in the HDD 8, and accordingly, even if the HDD 8 is illegally taken out, the estimation of the encryption key 91 becomes very difficult.

Figure 3:
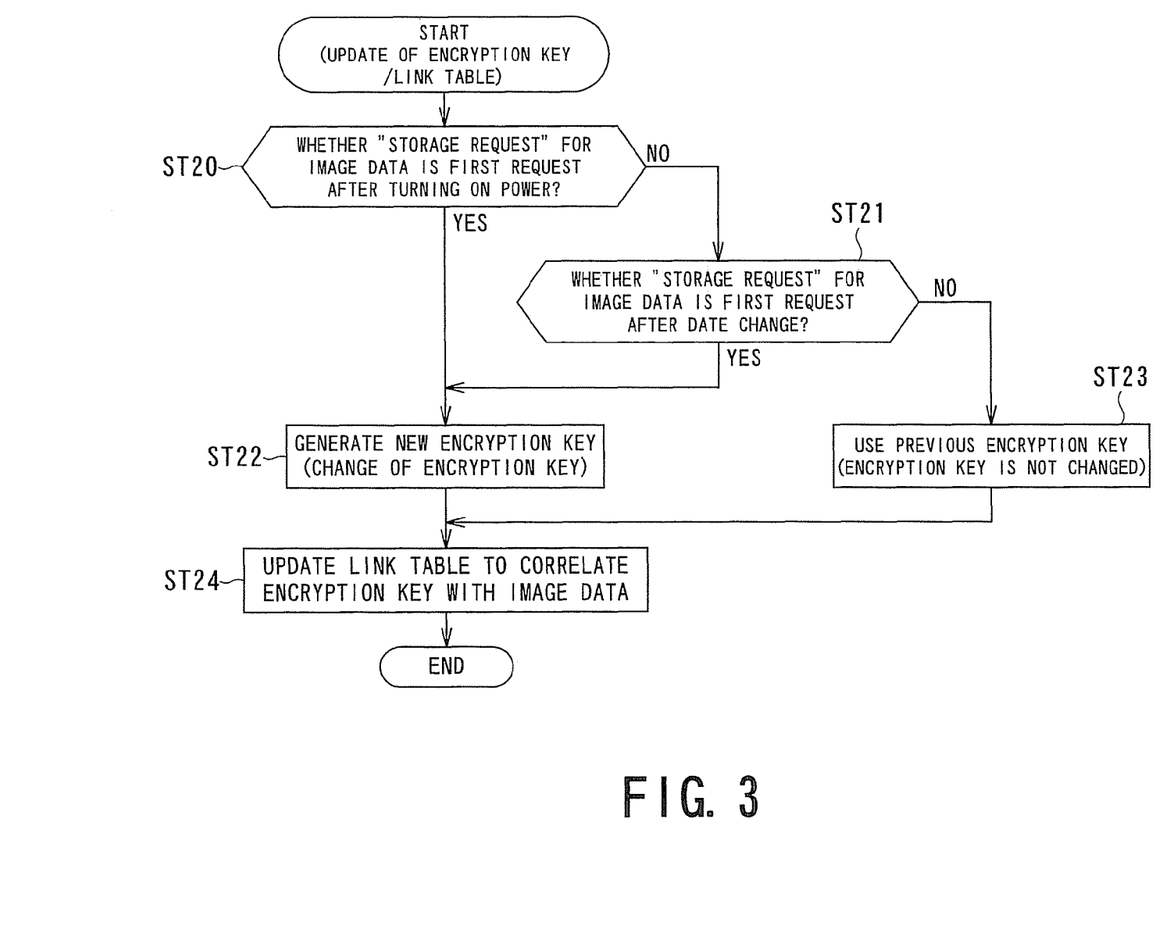
FIG. 3 is a flowchart showing an example of an update process of an encryption key and a link table.

FIG. 3 is a flowchart showing the details of the process of step ST2 (the update process of the encryption key 91 and the update process of the link table 92).

First, at step ST20, it is determined whether the storage request of the image data is the first storage request after the start of the image forming apparatus 1 (after turning on power). In the case where the first storage request occurs after turning on power, advance is made to step ST22, and a new encryption key 91 is generated.

On the other hand, in the case where the occurrence of the storage request of the image data is not the first after turning on power, at step ST21, it is further determined whether the storage request is the first storage request after date change. In the case of the first storage request after the date change, advance is made to step ST22, and also in this case, a new encryption key 91 is generated.

As stated above, each time the power of the image forming apparatus 1 is turned on or off, the new encryption key 91 is generated. In the case where the image forming apparatus 1 is set in a fax mode, it is conceivable that the operation is always performed in an energization state, and also in this case, the new encryption key 91 is generated each time the date is changed.

The update timing of the encryption key 91 is not always limited to the above two conditions, but may be updated at shorter intervals within a range where the management of the encryption key 91 does not become excessively complicated.

The encryption key 91 newly generated at step ST22 is quite different from the encryption key 91 used previously. Besides, it is desirable that the encryption key 91 is made the encryption key 91 different among the image forming apparatuses 1.

For example, the encryption key 91 is generated based on information (time information) of the date and time when the encryption key 91 is updated and a machine number (identification number information) unique to the individual image forming apparatus 1, so that the quite different encryption key 91 can be generated at each update, and the same encryption key 91 is never generated.

Besides, in the image forming apparatus 1, there is a mode in which a password is used for authentication of a user. In this case, the encryption key 91 may be generated based on the password inputted by the user in addition to the date and time information, and the machine number.

In the case where the storage of the image data is not the first after turning on the power and is performed on the same date, the encryption key 91 is not updated, but the encryption key 91 used previously is used (step ST23).

In this embodiment, as described above, the encryption key 91 is suitably updated, and the encryption of the image data is performed by the updated encryption key 91. Thus, it is necessary to perform correlation as to which image data is encrypted by which encryption key 91. A table for that purpose is the link table 92. In the link table 92, the correlation between the stored image data and the encryption key 91 for encryption of the image data is recorded.

At step ST24, the link table 92 is updated, and the correlation information between the newly stored image data and the encryption key 91 is added to the link table 92 each time the image data is stored.

Incidentally, the update of the encryption key 91 is performed by the key generating unit 21 of the control unit 2.

By using the encryption key 91 updated as stated above (in the case where turning on or off of the power source is not performed and the date is also not changed, the encryption key 91 previously used is used), the encryption of the image data is performed by the encryption unit 22 of the control unit 2 (step ST3 of FIG. 2). The encrypted image data is stored in the HDD 8 (step ST4).

On the other hand, when the image data stored in the HDD 8 is read and decrypted, the same encryption key 91 as that at the time of storage is required. Thus, it is necessary to store the successively generated encryption key 91 and the link table 92.

In this embodiment, these encryption keys 91 and the link table 92 are stored in a storage device different from the HDD 8. Specifically, as shown in FIG. 1, the encryption key 91 and the link table 92 are stored in the volatile memory 9 backed up by the backup battery 12.

As stated above, since the encrypted image data and the encryption key 91 are stored physically separately, even if the HDD 8 is illegally taken out to the outside, since the encryption key 91 is not stored in the HDD 8, the image data can not be decoded.

Further, since the encryption key 91 is stored in the volatile memory 9, even if the volatile memory 9 is also illegally taken out, the power supply to the memory is cut off at the time point when the volatile memory 9 is removed from the apparatus, and the inside encryption key 91 disappears.

In the normal operation, since the volatile memory 9 is backed up by the backup battery 12, even in the case where the power supply of the image forming apparatus 1 is turned off, the encryption key 91 does not disappear.

A process from step ST5 to step ST9 of FIG. 2 is a process for storing the encryption key 91 and the link table 92 into the volatile memory 9.

At step ST5, it is determined whether the encryption key 91 used for the encryption of the image data has been stored in the volatile memory 9.

In the case where it has not been stored, the encryption key 91 used for the encryption of the image data is encrypted by a second encryption key (step ST6), and then is stored in the volatile memory 9 (step ST7).

The reason why the encryption key 91 is encrypted using the second encryption key is to raise the confidentiality of the encryption key 91 stored in the volatile memory 9. The second encryption key used here is a fixed key which is not updated in order to avoid troublesomeness on the management. For example, the second encryption key is generated based on only the machine number of the image forming apparatus 1. Even in this case, since the encryption key 91 for encryption of the image data itself is successively updated, the safety of the image data itself can be sufficiently ensured.

In the case where the encryption key 91 used for the encryption of the image data has been stored in the volatile memory 9, advance is made directly to step ST8.

Step ST8 and step ST9 are a procedure to store the updated link table 92 into the volatile memory 9. Also in this case, the link table 92 is first encrypted by the second encryption key (step ST8), and then is stored in the volatile memory 9. The second encryption key used here is the same second encryption key as that used for the encryption of the encryption key 91.

(3) Read and Decryption Operation

Figure 4:
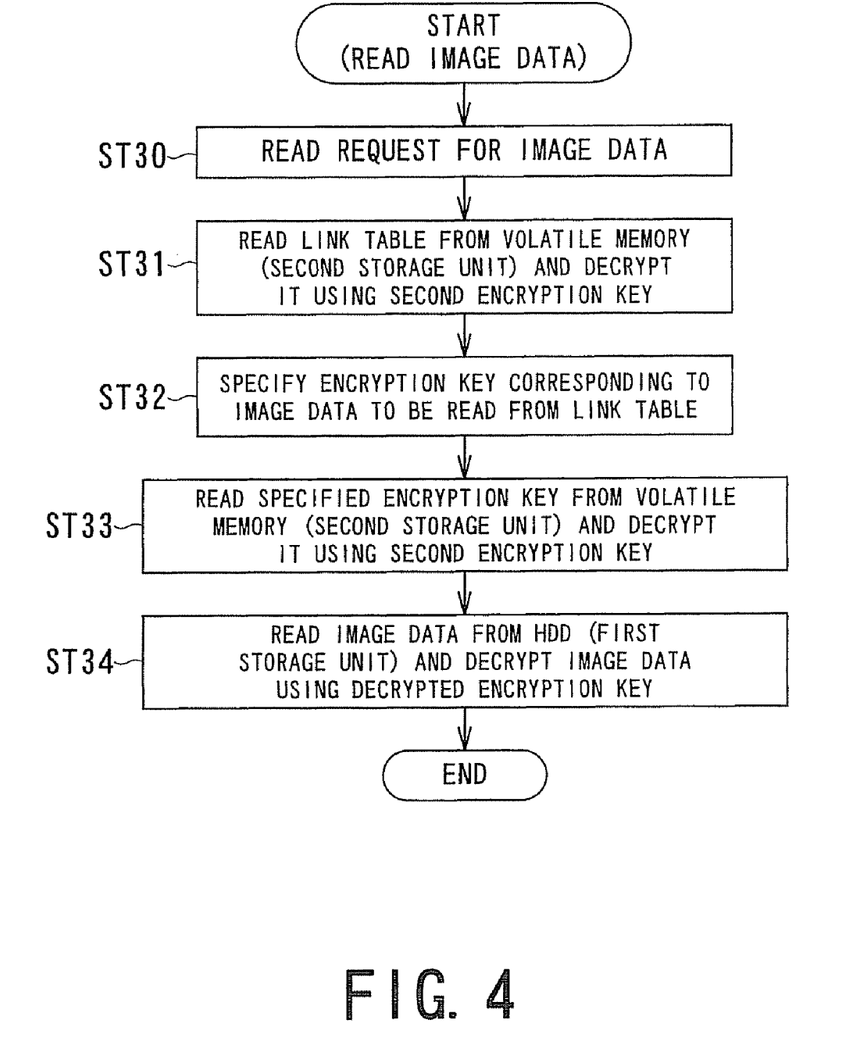
FIG. 4 is a flowchart showing an example of a read process of image data and a decryption process.

FIG. 4 is a flowchart showing a process example in which image data stored in the HDD 8 is read and is decrypted.

A read request for image data stored in the HDD 8 is generated by the user's operation of the operation display unit 11 or based on a read request from the external equipment 100 (step ST30).

When the read request is generated, first, the link table 92 is read from the volatile memory 9, and is decrypted using the second encryption key (step ST31).

Next, the encryption key 91 corresponding to the image data to be read is specified from the decrypted link table 92 (step ST32). Thereafter, the specified encryption key 91 is read from the volatile memory 9, and is similarly decrypted using the second encryption key (step ST33).

Finally, the image data read from the HDD 8 is decrypted using the decrypted encryption key 91.

(4) Delete Operation of Stored Data and Encryption Key

As described above, the encryption key 91 is stored in the volatile memory 9 each time the encryption key 91 is newly generated. Besides, the size of the link table 92 is also increased each time the image data is stored. Thus, when the image forming apparatus 1 is used for a long period of time, there is a possibility that the storage capacity of the volatile memory 9 becomes scarce. Then, it is necessary to take measures to delete the encryption key 91 which becomes unnecessary because of the deletion of the image data in the HDD 8 and to delete the item of the link table 92.

Figure 5:
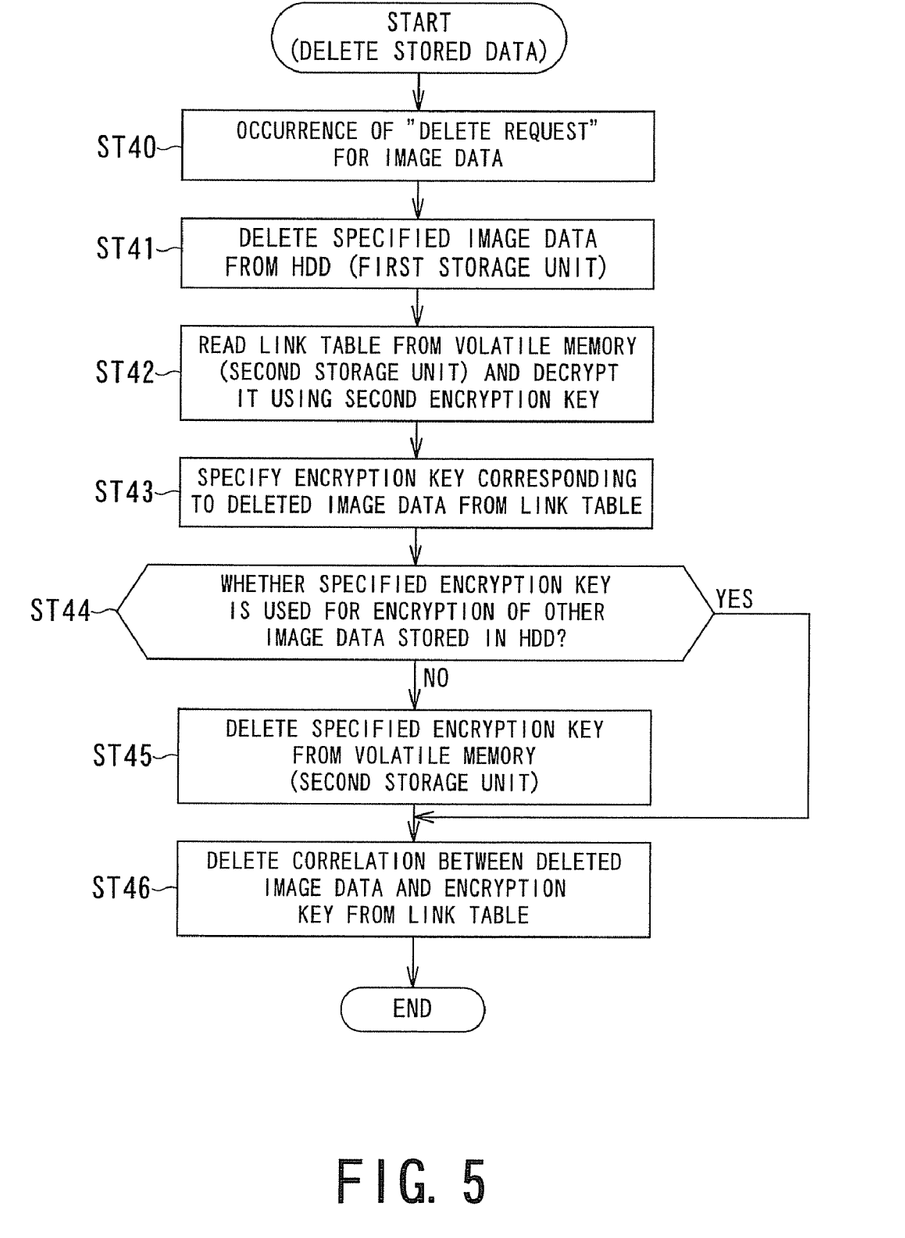
FIG. 5 is a flowchart showing an example of a delete process of stored data and a delete process of an encryption key in association with this.

FIG. 5 is a flowchart showing an example of the deletion of the stored data and the deleting operation of the encryption key 91 and the link table 92 resulting from this.

At step ST40, when a delete request of image data stored in the HDD 8 occurs, the specified image data is first deleted from the HDD 8 (step ST41).

Next, the link table 92 is read from the volatile memory 9, and is decrypted by the second encryption key (step ST42).

Further, reference is made to the decrypted link table 92, and the encryption key 91 correlated with the deleted image data is specified (step ST43).

Next, it is determined by referring to the link table 92 whether the specified encryption key 91 is used for the encryption of other image data which has been stored in the HDD 8 (step ST44). In the case where it is used for the encryption of the other image data (YES at step ST44), since the encryption key 91 can not be deleted, the process proceeds to step ST46. In step ST46, only the correlation between the deleted image data and the encryption key 91 in the link table 92 is deleted.

On the other hand, in the case where the specified encryption key 91 is used only for the deleted image data (NO at step ST44), since it is unnecessary to store the encryption key 91, the key is deleted from the volatile memory 9 (step ST45). Further, the correlation between the deleted image data and the encryption key 91 in the link table 92 is also deleted.

As stated above, the encryption key 91 of the volatile memory 9 and the correlation of the link table 92 are deleted in connection with the deletion of the image data of the HDD 8, so that the overflow of the volatile memory 9 can be avoided.

As described above, according to the image forming apparatus 1 of the embodiment and the control method thereof, since the image data is encrypted by the successively updated encryption key 91, the possibility that each of the encryption keys 91 is estimated becomes very low. Besides, even if some of the encryption keys 91 are estimated, only partial image data in the HDD 8 is decoded, and all image data in the HDD are not decoded or are not falsified, and accordingly, high security can be ensured.

Besides, since the update of the encryption key 91 is automatically performed according to the on or off of the power supply or the change of the date, a specific operation burden is not imposed on a user.

Further, since the encryption key 91 itself is encrypted and is stored in the volatile memory 9 different from the HDD 8, it is also possible to prevent illegal taking-out and decoding of the encryption key 91.

The present invention is not limited to the embodiment described above, but can be embodied at the practical phase by modifying the components within the scope not departing from the gist. Besides, various embodiments of the invention can be formed by suitable combinations of plural components disclosed in the embodiment. For example, some components may be deleted from all the components described in the embodiment. Further, components in different embodiments may be suitably combined.

What is claimed is:

1. An image forming apparatus comprising:
   a scanner configured to read an original document to generate image data;
   a key generating unit configured to change an encryption key and to generate the encryption key different from the previous encryption key at each time of change, the encryption key being newly generated each time the power of the image forming apparatus is turned on or off;
   an encryption unit configured to encrypt the image data using the encryption key generated by the key generating unit;
   a first storage unit configured to store the encrypted image data;
   a second storage unit configured to store the encryption key and a table to correlate the image data encrypted by the encryption key with the encryption key;
   a decryption unit configured to decrypt the encrypted image data stored in the first storage unit by using the encryption key correlated in the table to generate decrypted image data, and
   a printer configured to print the decrypted image data on a sheet.

2. The image forming apparatus according to claim 1, wherein the encryption key is further newly generated each time the data is changed.

3. The image forming apparatus according to claim 1, wherein the key generating unit generates the encryption key based on identification number information of the apparatus and time information of a time of the change of the encryption key.

4. The image forming apparatus according to claim 3, wherein the key generating unit generates the encryption key further based on password information used for user authentication.

5. The image forming apparatus according to claim 1, wherein the encryption key and the table are encrypted by a second encryption key different from the encryption key for encryption of the image data, and then are stored in the second storage unit.

6. The image forming apparatus according to claim 5, wherein the second encryption key is a fixed encryption key which is not changed.

7. The image forming apparatus according to claim 1, wherein the first storage unit includes a nonvolatile memory, and the second storage unit includes a volatile memory backed up by a battery.

8. The image forming apparatus according to claim 1, wherein when the image data stored in the first storage unit is deleted, in a case where an encryption key correlated with the image data is not correlated with other image data, the encryption key is also deleted.

9. An image forming apparatus comprising:
   means for reading an original document to generate image data;
   means for changing an encryption key;
   means for generating the encryption key different from the previous encryption key at each time of change, the encryption key being newly generated each time the power of the image forming apparatus is turned on or off;
   means for encrypting the image data using the generated encryption key;
   first means for storing the encrypted image data;
   second means for storing the encryption key and a table to correlate the image data encrypted by the encryption key with the encryption key;
   means for decrypting the stored encrypted image data by using the encryption key correlated in the table to generate decrypted image data; and
   means for printer the decrypted image data on a sheet.

10. The image forming apparatus according to claim 9, wherein the encryption key is further newly generated each time the date is changed.

11. The image forming apparatus according to claim 9, wherein the generating means generates the encryption key based on identification number information of the apparatus and time information of a time of the change of the encryption key.

12. The image forming apparatus according to claim 9, wherein the encryption key and the table are encrypted by a second encryption key different from the encryption key for encryption of the image data, and then are stored in the second storage unit.

13. A control method of an image forming apparatus, comprising the steps of:
   reading, by a scanner of the image forming apparatus, an original document to generate image data;
   changing an encryption key;
   generating the encryption key different from the previous encryption key at each time of change, the encryption key being newly generated each time the power of the image forming apparatus is turned on or off;

encrypting the image data using the generated encryption key;

first storing the encrypted image data into a first storage unit;

second storing the encryption key and a table to correlate the image data encrypted by the encryption key with the encryption key into a second storage unit;

decrypting the encrypted image data stored in the first storage unit by using the encryption key correlated in the table to generate decrypted image data; and printing, by a printer of the image forming apparatus, the decrypted image data on a sheet.

14. The control method of the image forming apparatus according to claim 13, wherein the encryption key is further newly generated each time the date is changed.

15. The control method of the image forming apparatus according to claim 13, wherein at the generating step, the encryption key is generated based on identification number information of the apparatus and time information of a time of the change of the encryption key.

16. The control method of the image forming apparatus according to claim 15, wherein at the generating step, the encryption key is generated further based on password information used for user authentication.

17. The control method of the image forming apparatus according to claim 13, wherein the encryption key and the table are encrypted by a second encryption key different from the encryption key for encryption of the image data, and then are stored in the second storage unit.

18. The control method of the image forming apparatus according to claim 17, wherein the second encryption key is a fixed encryption key which is not changed.

19. The control method of the image forming apparatus according to claim 13, wherein the first storage unit includes a nonvolatile memory, and the second storage unit includes a volatile memory backed up by a battery.

20. The control method of the image forming apparatus according to claim 13, wherein when the image data stored in the first storage unit is deleted, in a case where an encryption key correlated with the image data is not correlated with other image data, the encryption key is also deleted.

* * * * *